(12) United States Patent
Morales et al.

(10) Patent No.: US 11,483,612 B2
(45) Date of Patent: Oct. 25, 2022

(54) VEHICLE ENTERTAINMENT SYSTEM PROVIDING PAIRED WIRELESS CONNECTIONS FOR MULTIPLE WIRELESS HEADPHONES AND RELATED METHODS

(71) Applicant: VOXX INTERNATIONAL CORPORATION, Hauppauge, NY (US)

(72) Inventors: Mike Morales, Orlando, FL (US); Jonathan Reiblich, Winter Springs, FL (US); Robert Holton, Orlando, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 159 days.

(21) Appl. No.: 16/659,689

(22) Filed: Oct. 22, 2019

(65) Prior Publication Data

US 2020/0128291 A1    Apr. 23, 2020

Related U.S. Application Data

(60) Provisional application No. 62/748,728, filed on Oct. 22, 2018.

(51) Int. Cl.
*H04N 7/18*        (2006.01)
*H04N 21/43*       (2011.01)
(Continued)

(52) U.S. Cl.
CPC . *H04N 21/43079* (2020.08); *H04N 21/41422* (2013.01); *H04N 21/42204* (2013.01);
(Continued)

(58) Field of Classification Search
CPC .... H04N 7/18; H04N 21/414; H04N 21/4307; H04N 21/43076; H04N 21/41422;
(Continued)

(56) References Cited

U.S. PATENT DOCUMENTS 6,414,960 B1 *  7/2002  Kuhn ..................... H04N 7/088
                                                    348/181
6,678,892 B1 *  1/2004  Lavelle .................. H04N 7/181
                                                    725/75
(Continued)

FOREIGN PATENT DOCUMENTS

DE    102016201680    8/2017
JP    2006287730      10/2006

OTHER PUBLICATIONS

"EVO The ultimate connected entertainment experience" Voxx Automative: https://sc.voxxintl.com>docs>voxx-hm>EVO-brochure; Nov. 2017; pp. 3.

*Primary Examiner* — Trang U Tran
(74) *Attorney, Agent, or Firm* — Allen, Dyer, Doppelt + Gilchrist, P.A.

(57) ABSTRACT

A vehicle entertainment system is for use with wireless headphones, with each wireless headphone being operable via a respective paired wireless connection. The vehicle entertainment system may include video entertainment displays for a vehicle, and a controller for the vehicle. The controller may be configured to establish respective paired wireless connections with the wireless headphones, and provide selectable access to a plurality of different audio/video (A/V) entertainment content streams. Each of the A/V entertainment content streams may include a respective video entertainment stream and an associated audio entertainment stream. The controller may be further configured to send selected video entertainment content streams for viewing at the video entertainment displays, and send selected (Continued)

audio entertainment content streams over the respective paired wireless connections for hearing at the wireless headphones.

15 Claims, 7 Drawing Sheets

(51) Int. Cl.
- *H04N 21/414* (2011.01)
- *H04N 21/422* (2011.01)
- *H04N 21/4363* (2011.01)
- *H04N 21/6408* (2011.01)
- *H04R 1/10* (2006.01)

(52) U.S. Cl.
CPC . *H04N 21/43076* (2020.08); *H04N 21/43637* (2013.01); *H04N 21/6408* (2013.01); *H04R 1/1008* (2013.01); *H04R 2420/07* (2013.01)

(58) Field of Classification Search
CPC ....... H04N 21/42204; H04N 21/43637; H04N 21/6408; H04R 1/1008; H04R 2420/07
USPC .............. 725/75, 76, 77; 348/837, 552, 148; 455/41.1, 66, 95
See application file for complete search history.

(56) References Cited

U.S. PATENT DOCUMENTS

| | | | |
|---|---|---|---|
| 6,871,356 B2 * | 3/2005 | Chang | H04N 21/61 |
| | | | 725/75 |
| 7,692,724 B2 * | 4/2010 | Arora | G11B 27/10 |
| | | | 348/473 |
| 8,136,138 B2 * | 3/2012 | Jira | H04L 67/12 |
| | | | 725/75 |
| 8,432,262 B2 * | 4/2013 | Talty | H04W 12/06 |
| | | | 340/10.51 |
| 8,520,152 B2 | 8/2013 | Caltabiano et al. | |
| 8,730,413 B2 | 5/2014 | Tranchina | |
| 9,139,139 B2 | 9/2015 | Mitchell | |
| 9,150,164 B2 | 10/2015 | Mitchell | |
| 9,348,368 B2 | 5/2016 | Mitchell | |
| 9,393,915 B2 | 7/2016 | Vitito | |
| 10,362,422 B2 * | 7/2019 | Borne | H04N 5/04 |
| 10,432,997 B2 | 10/2019 | Morales et al. | |
| 2004/0073932 A1 | 4/2004 | Lavelle | |
| 2005/0251833 A1 | 11/2005 | Schedivy | |
| 2016/0198288 A1 | 7/2016 | Burns | |
| 2017/0195708 A1 | 7/2017 | Morales et al. | |
| 2018/0184477 A1 | 6/2018 | Paredes et al. | |

* cited by examiner

VEHICLE ENTERTAINMENT SYSTEM PROVIDING PAIRED WIRELESS CONNECTIONS FOR MULTIPLE WIRELESS HEADPHONES AND RELATED METHODS

RELATED APPLICATIONS

This application claims the benefit of provisional application Ser. No. 62/748,728 filed Oct. 22, 2018, which is hereby incorporated herein in its entirety by reference.

TECHNICAL FIELD

The present invention relates to the field of vehicle systems, and, more particularly, to vehicle entertainment systems and related methods.

BACKGROUND

Vehicle entertainment systems (which are also referred to as in-car entertainment (ICE), in-vehicle infotainment (IVI) and rear seat entertainment (RSE) systems) typically include one or more video displays (e.g., LED, LCD, etc.) and associated hardware/software components to provide audio/video (A/V) streams for users at the various displays. A/V content may be played from various media sources, such as mobile electronic devices, DVD players, streaming services, etc.

One example RSE system is set forth in U.S. Pat. No. 10,432,997 to Morales et al., which is assigned to the present Applicant and hereby incorporated herein in its entirety by reference. This RSE system includes an access point and a second housing. The access point includes a first screen and input/output ports. The access point is included in a first housing. The second housing is separate from the first housing and includes a second screen. The access point is configured to display first content on the first screen and stream the first content displayed on the first screen to the second housing so that the first content is displayed on the first and second screens. The access point is further configured to receive second content from a mobile device, display the second content on the first screen and stream the second content displayed on the first screen to the second housing so that the second content is displayed on the first and second screens.

Another vehicle entertainment unit is set forth in U.S. Pat. No. 9,591,432 to Burns, which is also assigned to the present Applicant and is hereby incorporated herein in its entirety by reference. This patent discloses a method of controlling a vehicle entertainment unit mounted in a vehicle using a center stack control system of the vehicle which includes establishing a Bluetooth connection between the center stack control system and the vehicle entertainment unit, retrieving metadata from the vehicle entertainment unit, and transmitting the metadata from the vehicle entertainment unit to the center stack control system via the Bluetooth connection. The method further includes receiving a control command at the vehicle entertainment unit via the Bluetooth connection, mapping the control command to a corresponding function of the vehicle entertainment unit at the vehicle entertainment unit, and executing the corresponding function at the vehicle entertainment unit.

Despite the advantages of such configurations, further enhancements and features in vehicle entertainment systems may be desirable in some applications.

SUMMARY

A vehicle entertainment system is for use with a plurality of wireless headphones, with each wireless headphone being operable via a respective paired wireless connection. The vehicle entertainment system may include a plurality of video entertainment displays for a vehicle, and a controller for the vehicle. The controller may be configured to establish respective paired wireless connections with the plurality of wireless headphones, and provide selectable access to a plurality of different audio/video (A/V) entertainment content streams. Each of the A/V entertainment content streams may include a respective video entertainment stream and an associated audio entertainment stream. The controller may be further configured to send selected video entertainment content streams for viewing at the plurality of video entertainment displays, and send selected audio entertainment content streams over the respective paired wireless connections for hearing at the plurality of wireless headphones.

In an example implementation, the controller may be configured to introduce at least one time delay to synchronize viewing and hearing. More particularly, the controller may be configured to introduce the at least one time delay based upon respective time delays associated with the plurality of paired wireless connections, for example.

At least one of the video entertainment displays may comprise a touch screen video display configured to provide a user interface for the controller, for example. Furthermore, in some embodiments the controller may be configured to establish a wireless connection external from the vehicle to provide the selectable access to at least one of the plurality of different A/V entertainment content streams.

By way of example, each of the respective paired wireless connections may comprise a unicast paired wireless connection. Furthermore, the controller may comprise a respective wireless transceiver for each respective wireless connection, such as Bluetooth wireless transceivers, for example. In one example embodiment, the controller may comprise electronic circuitry at least some of which is collocated with at least one of the video entertainment displays. In another example embodiment, the controller may comprise electronic circuitry at least some of which is remote from the video entertainment displays.

A related controller for a vehicle entertainment system, such as the one described briefly above, is also provided. Moreover, a related method of providing vehicle entertainment with a plurality of wireless headphones and a plurality of video entertainment displays is also provided, in which each wireless headphone is operable via a respective paired wireless connection. The method may include operating a controller at the vehicle to establish respective paired wireless connections with the plurality of wireless headphones, and provide selectable access to a plurality of different A/V entertainment content streams, with each A/V entertainment content stream comprising a respective video entertainment stream and an associated audio entertainment stream. The controller may also be operated to send selected video entertainment content streams for viewing at the plurality of video entertainment displays, and send selected audio entertainment content streams over the respective paired wireless connections for hearing at the plurality of wireless headphones.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime/multiple-prime notation is used to indicate similar elements in alternative embodiments.

Figure 1:
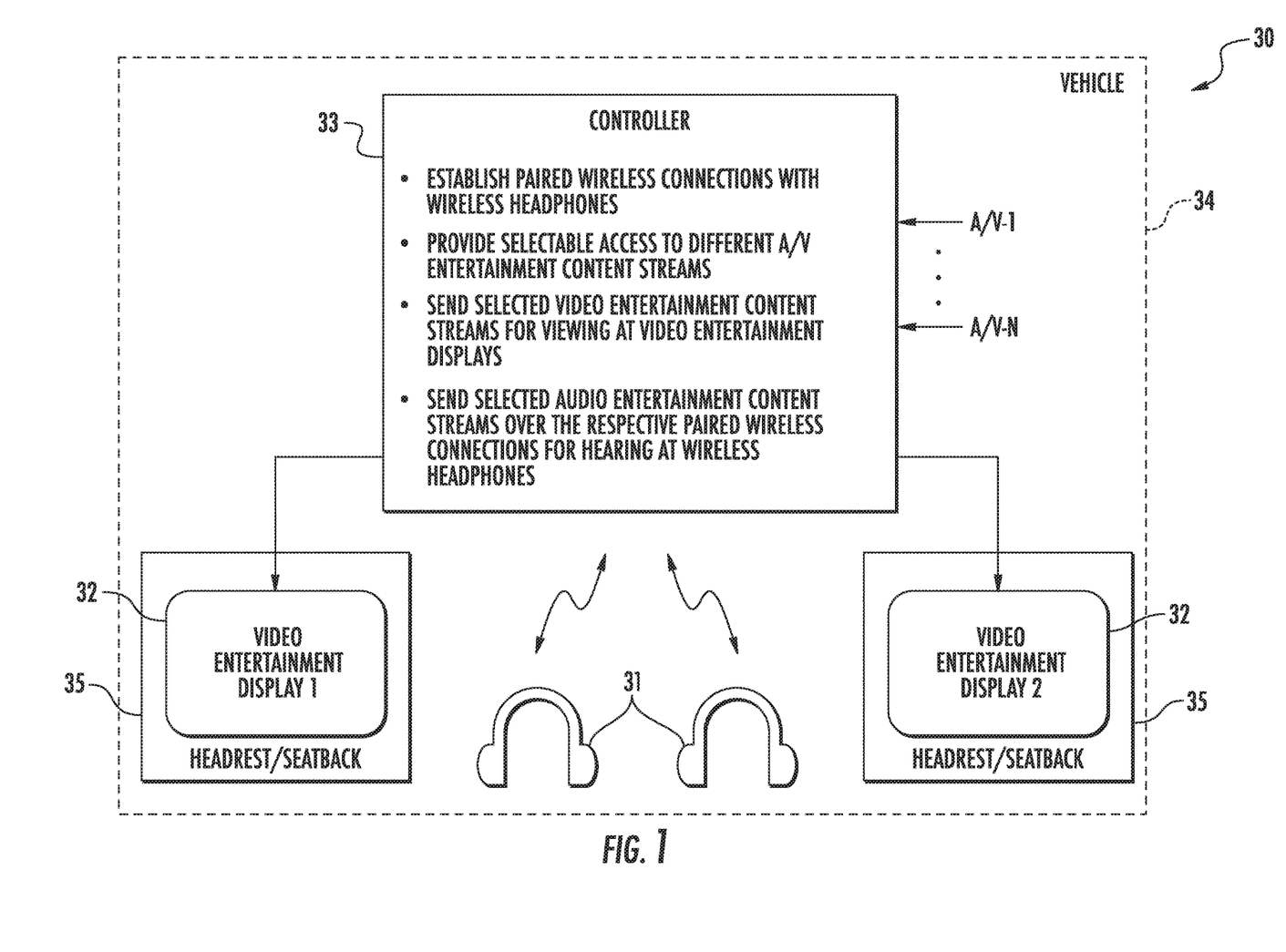
FIG. 1 is a schematic block diagram of a vehicle entertainment system in accordance with an example embodiment.

Referring initially to FIG. 1, a vehicle entertainment system 30 is for use with a plurality of wireless headphones 31, with each wireless headphone being operable via a respective paired wireless connection. By way of example, the paired wireless connection may be a Bluetooth connection, which is a peer-to-peer unicast wireless link in the ultra-high frequency (UHF) range, as will be appreciated by those skilled in the art. However, other suitable paired wireless communication link formats may also be used in different embodiments. It should be noted that reference to "wireless headphones" herein includes dual and single-ear, as well as in-ear/over-ear, configurations.

The vehicle entertainment system 30 illustratively includes a plurality of video entertainment displays 32 and a controller 33 for a vehicle 34. In the illustrated example, the video displays 32 are part of a rear seat entertainment (RSE) configuration in which the displays are carried by (or mounted within) a respective seatback or headrest 35. However, it will be appreciated that in some embodiments displays 32 may be mounted elsewhere, such as drop-down displays from a ceiling of the vehicle 34, dashboard mounted displays, etc. Various display types may be used, such as liquid crystal display (LCD), light emitting diode (LED), organic light emitting diode (OLED), etc.

The controller 33 may be implemented using appropriate hardware (e.g., microprocessor, transceivers, audio/video (A/V) switching circuitry, etc.) and associated non-transitory computer-readable medium including computer-executable instructions for causing the controller 33 to perform the operations discussed further below. More particularly, the controller 33 is configured to establish respective paired wireless connections with the plurality of wireless headphones 31. Moreover, the controller 33 also provides selectable access to a plurality of different A/V entertainment content streams A/V-1 through A/V-N. Each of the A/V entertainment content streams A/V-1 through A/V-N includes a respective video entertainment stream and an associated audio entertainment stream.

Figure 2:
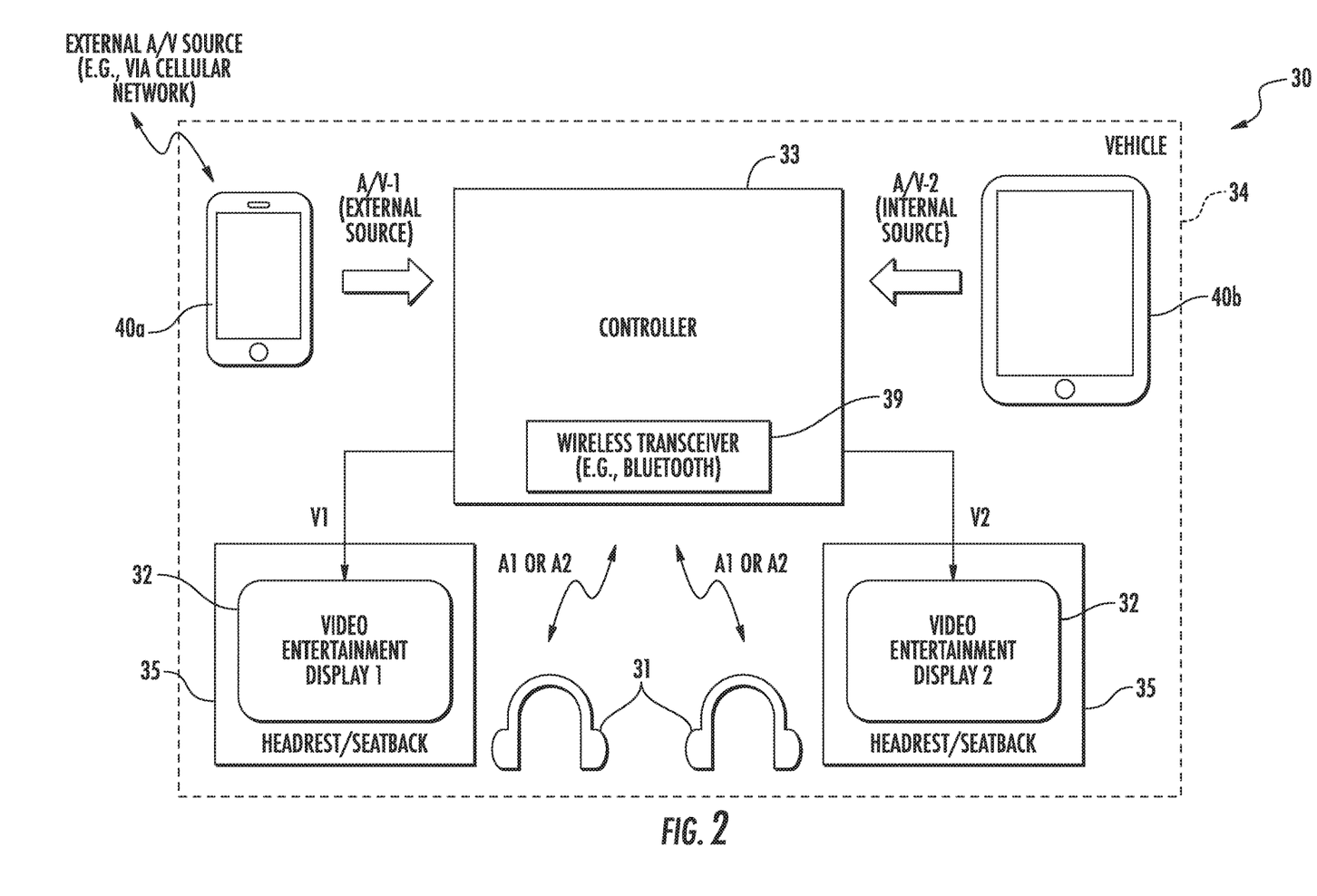
FIG. 2 is a schematic block diagram of the vehicle entertainment system of FIG. 1 illustrating different audio/video (A/V) sources which may be used therewith in an example implementation.

Referring more particularly to the example of FIG. 2, A/V content may be provided to the controller 33 by various different sources. In the illustrated example, the controller 33 establishes a connection with a first mobile wireless device 40a, which may be via a wired link (USB, etc.) or a wireless link (e.g., Bluetooth, Wi-Fi, etc.). The first mobile wireless device 40a further communicates with an external A/V source(s) via another wireless communications link, e.g., a cellular link. By way of example, such external A/V sources may include A/V streaming subscription services such as Netflix® and Hulu®, as well as other sources such as YouTube®, etc. In some embodiments, the first mobile wireless device 40a may act as a wireless hot spot for the controller 33 to access A/V content. In other embodiments, the controller 33 may have its own transceiver (e.g., a cellular transceiver) associated therewith for receiving A/V content directly, which may be mounted within the vehicle 34 with the controller 33, for example.

Furthermore, a second mobile wireless device 40b is also similarly illustratively connected with the controller 33 (e.g., via a wired or wireless connection) and provides local A/V content to the controller 33 (e.g., stored videos/movies, games, apps, etc.). Other devices may also be used to provide local A/V content to the controller 33, such as a DVD player, flash drive, SD card reader, etc., in some configurations.

Whether from a local or external source, the controller 33 is advantageously configured to send selected video entertainment content streams (there are two video streams V1 and V2 in the present example) for viewing at the video entertainment displays 32. That is, the controller 33 may advantageously allow all of the available media content located on any of the above-noted media sources to be shared and viewed at each display 32 independently or simultaneously. As will be discussed further below, the controller 33 may advantageously provide a user interface (UI) to passengers at the displays 35 (or elsewhere) to provide for navigation and user selection from among the different media sources on demand.

Furthermore, the controller 33 also illustratively includes one or more wireless (e.g., Bluetooth) transceivers 39, and is advantageously configured to send selected audio entertainment content streams (there are two audio streams A1 and A2 in the present example) via the transceiver(s) 39 over the respective paired wireless connections for hearing at the wireless headphones 31. By way of background, typical RSE units provide wireless headphone connections using a broadcast (unpaired) wireless format, such as infrared (IR), for example. While this approach allows for different sets of headphones to readily tune to a same audio stream (e.g., where multiple users want to watch the same video stream on a shared display), it is problematic in that such headphones are less common and not favored by some users. On the other hand, unicast headphones (such as Bluetooth headphones) are readily available, and many users already carry their own personal headphones for use with smart devices, etc.

Yet, while unicast headphones are well suited for pairing with a single smart device for listening to audio streams, for example, problems may otherwise arise when attempting to use a unicast (e.g., Bluetooth) format in applications, such as RSE systems. More particularly, each of the wireless headphones 31 needs to be paired with a Bluetooth transceiver for unicast communications. As a result, this may make it difficult to switch between different audio streams corresponding to the video streams showing on different displays 32. Moreover, because respective unicast communications are occurring with each of the wireless headphones 31, there may be different latencies or delays over each of these unicast links. While this might not be a problem for audio only streaming, in the case of an RSE system, it may be troublesome in that this may result in synchronization problems between the audio heard at the wireless headphones 31 and the video viewed at the corresponding display 32. This problem would otherwise be compounded when there are multiple users all looking at a same display 32, yet each having a different audio delay over their respective paired wireless headphone link.

Figure 3:
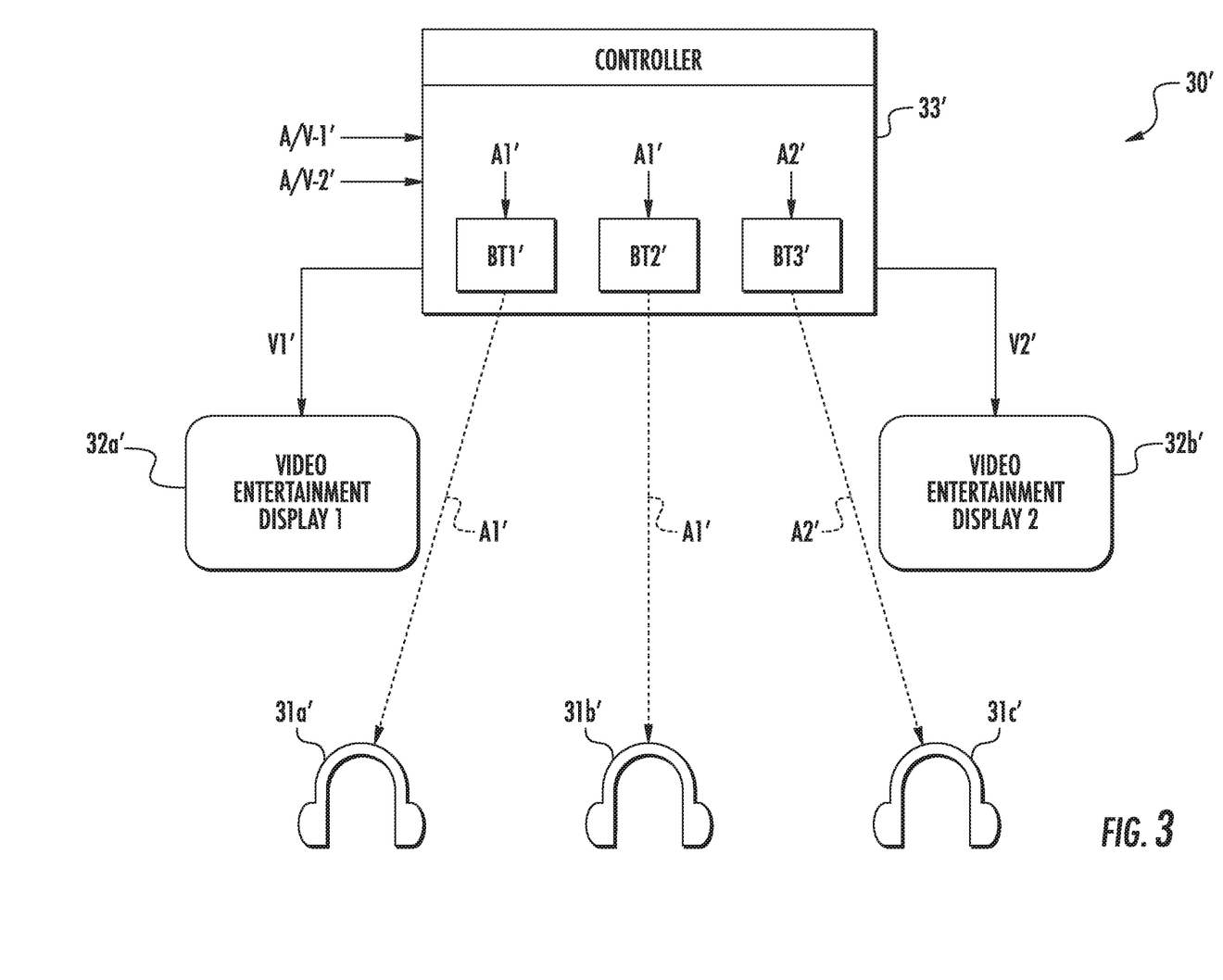
FIGS. 3-4 are schematic block diagrams illustrating an example implementation of the system of FIG. 1 in which the control circuitry is located remote from the displays.
Figure 4:
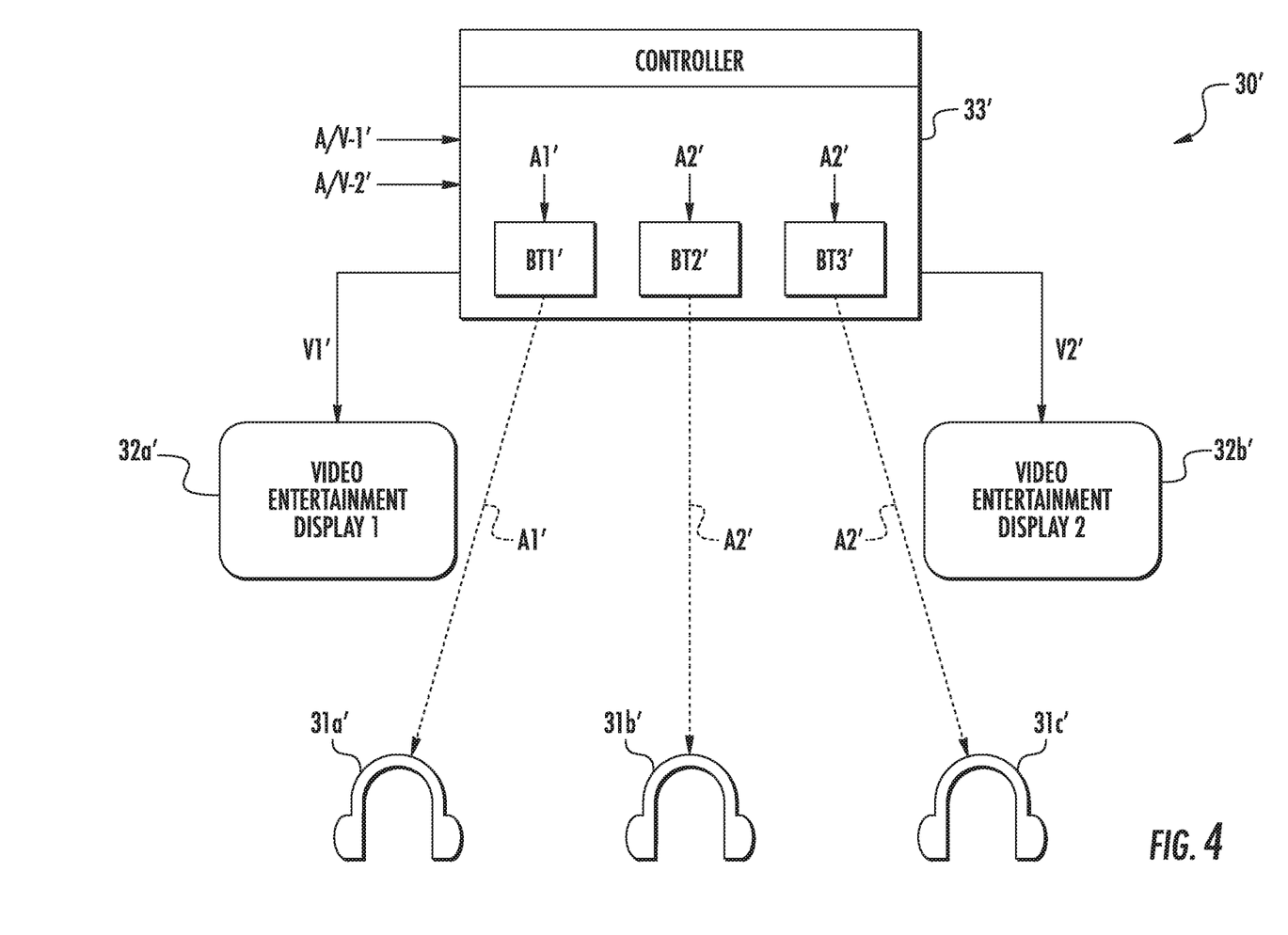

Turning now to FIGS. 3-4, in one example embodiment the video displays 32' are remotely located from the controller 33'. That is, at least some of the A/V circuitry, including Bluetooth circuitry providing links BT1'-BT3' in this example, is located separately from the video displays 32' (which again may be at a headrest/seatback, ceiling mounted, dashboard mounted, etc.). The paired Bluetooth links BT1'-BT3' may be provided by one or more transceivers on one or more chip sets, as will be appreciated by those skilled in the art. More particularly, each link BT1'-BT3' may be associated with a respective (individual) transceiver, or in some instances a single transceiver may pair with more than one set of headphones 31a'-31c' (e.g., through bandwidth sharing, etc.).

The controller 33' receives A/V streams A/V-1' and A/V-2' and is configured to route the associated video streams V1', V2' to either of the displays 32'. Moreover, the controller 33' is also configured to route each of the respective audio streams A1', A2' corresponding to the video streams V1', V2' over each of the Bluetooth links BT1'-BT3', such that the transceivers can send either of these audio streams to any of the wireless headphones 31a'-31c' it is paired with on demand. Again, while only two A/V streams are shown in the present example for clarity of illustration, it will be appreciated that other numbers of streams may be used in different embodiments.

In the example illustrated in FIG. 3, the wireless headphones 31a', 31b' are respectively paired via the links BT1' and BT2' and receiving the first audio stream A1' corresponding to the video stream V1' being displayed on the video display 32a'. Furthermore, the wireless headphones 31c' are paired via the link BT3' and receiving the audio stream A2' corresponding to the video V2' playing on the display 32b'.

Considered in other terms, in the example of FIG. 3 the users of the wireless headphones 31a', 31b' are watching the same video stream V1' on the video display 32'. For example, this might occur when a user sits in a middle rear seat of a vehicle, and accordingly may be able to view RSE displays to the right or left, and wants to have the ability to listen to the corresponding audio for either of the video streams being shown on the two different RSE displays. Thus, in the example shown in FIG. 4, the controller 33' causes the audio being transmitted over the link BT2' to switch from the first audio stream A1' to the second audio stream A2' for the wireless headphones 31b' (e.g., the headphones being worn by the user sitting in the middle rear seat). This switching may be performed on-demand responsive to user selection through a UI. As noted above, the UI may be provided at one or both of the displays 32a', 32b', and/or it may also be provided through a mobile wireless device running a connected app, in that the UI of the mobile wireless device may be used as an input device for the controller 33', as will be appreciated by those skilled in the art.

Figure 5:
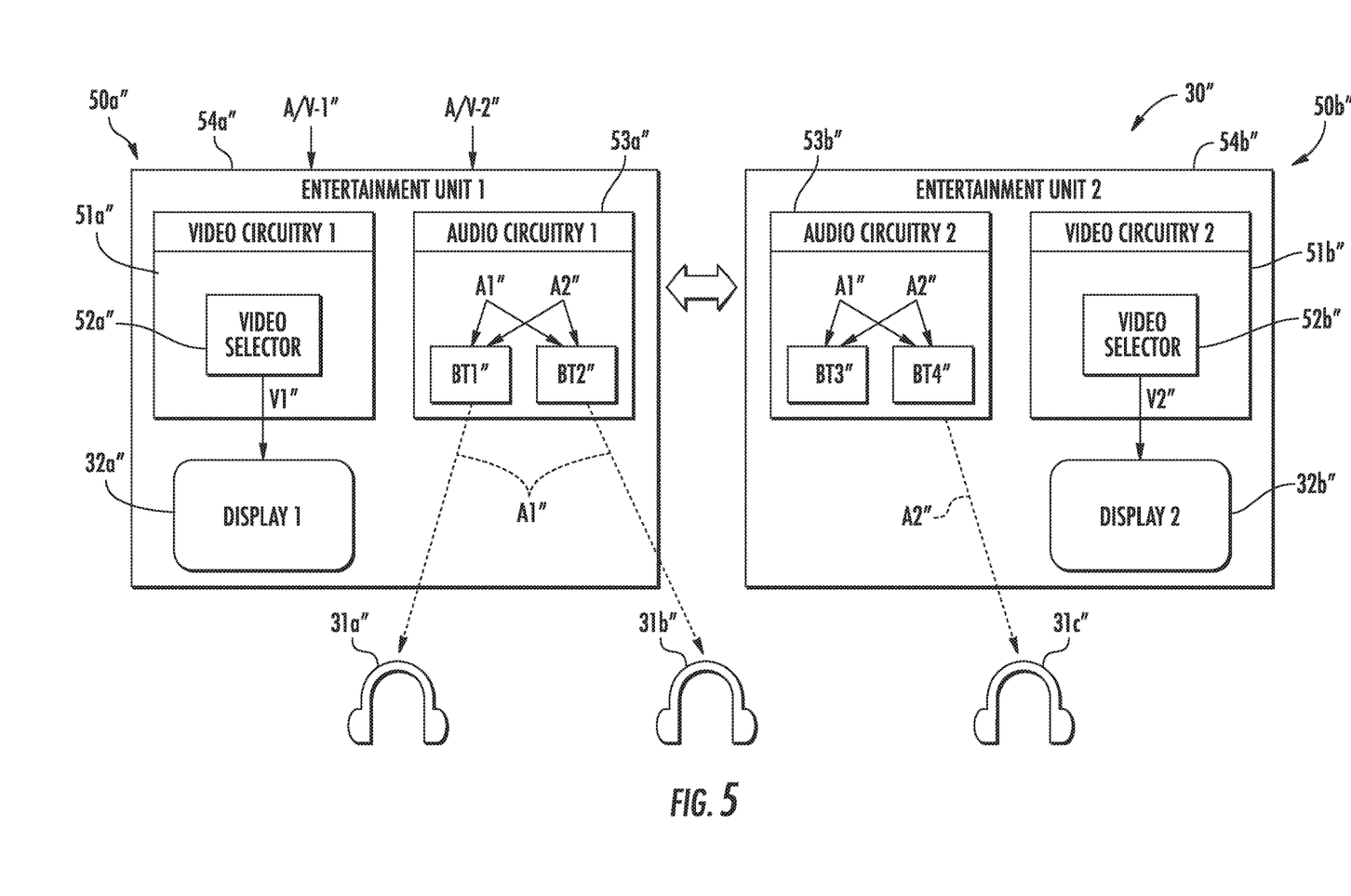
FIG. 5 is a schematic block diagram illustrating an alternative embodiment of the system of FIG. 1 in which control circuitry is located within an entertainment unit also including a display.

Turning now to another example implementation of the system 30" shown in FIG. 5, here the above-described controller functions and components are incorporated within respective RSE units 50a", 50b" in common housings 54a", 54h" shared with displays 32a", 32b". More particularly, each RSE unit 50a", 50b" illustratively includes respective video circuitry 51a", 51b" (including video selectors 52a", 52b"), and audio circuitry 53a", 53h" with one or more transceivers for providing links BT1", BT2", BT3", BT4". The video selectors 52a", 52h" allow for switching between the available A/V inputs A/V-1" and A/V-2" (although here again there may be more than just two A/V inputs) to advantageously provide the desired video stream V1" or V2" to the displays 32a", 32h" on demand (e.g., upon selection by a user through a UI).

In the illustrated embodiment, the first and second RSE units 50a", 50b" are paired with one another, such as through a Wi-Fi peer-to-peer (P2P) link 55", for example. This permits operation of the RSE units 50a", 50b" in a master-slave mode in which one of the units can receive A/V content and distribute it to the other. Moreover, the RSE units 50a", 50b" may also operate in a mirrored mode, in which they can each share A/V content with the other (e.g., A/V content from a local source connected to a first RSE unit may also be played back at the second unit).

In the illustrated example, the audio streams A1" and A2" are multiplexed to be selectively shared with the Bluetooth headphones 31a"-31c", each with their own unicast connection to one of the Bluetooth links BT1"-BT4". In the present example, four Bluetooth links BT1"-BT4" are shown, but it will be appreciated that other numbers may be used in different embodiments. As noted above, both audio streams A1" and A2" corresponding to the video streams V1" and V2", respectively, are available to all of the Bluetooth headphones 31a"-31c". As also noted above, in some configurations, one or more of the Bluetooth transceivers may have the ability to connect to more than one set of Bluetooth headphones 31a"-31c" (e.g., through bandwidth sharing, etc.).

The Bluetooth transceiver(s) may be considered to be multi-stream capable in that they may receive as inputs multiple available audio inputs. For example, this may be accomplished by digitally multiplexing the audio streams and pushing the selected audio stream A1" or A2" to the respective headphones 31a"-31c" connected to each channel Bluetooth link or channel. As noted above, the particular audio stream A1", A2" that will be sent to each of the headphones 31a"-31b" may be selected at the display 32a" or 32b", and/or through a connected app (or other UI), for example.

In some embodiments, multiplexing of the audio streams A1", A2" may not be required. For example, during a pairing process, the headphones 31a"-31c" may be given a common name and independently paired to respective Bluetooth links BT1"-BT4". This process may or may not be visible to the end user. In an example implementation, the end user may select an icon on a UI menu and be prompted to select the Bluetooth headphone they would like to use. At this time, the system 30" would "bind" the headphone 31a", 31b", or 31c" to the appropriate display 32a", 32h" and stream the corresponding audio content. In the illustrated example, the headphones 31a", 31b" receive the audio stream A1" corresponding to the video V1" shown on the display 32a", while the headphones 31c" receive the audio stream A2" corresponding to the video V2" shown on the display 32b".

Figure 6:
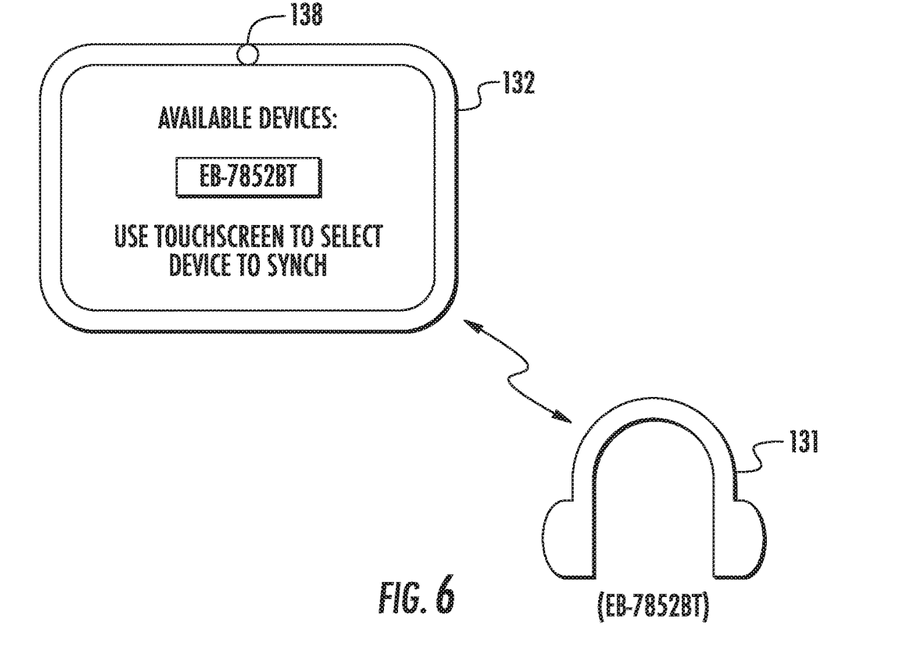
FIGS. 6-8 are a series of schematic block diagrams illustrating an example approach for pairing wireless headphones and synchronizing audio and video playback for the system of FIG. 1.
Figure 7:
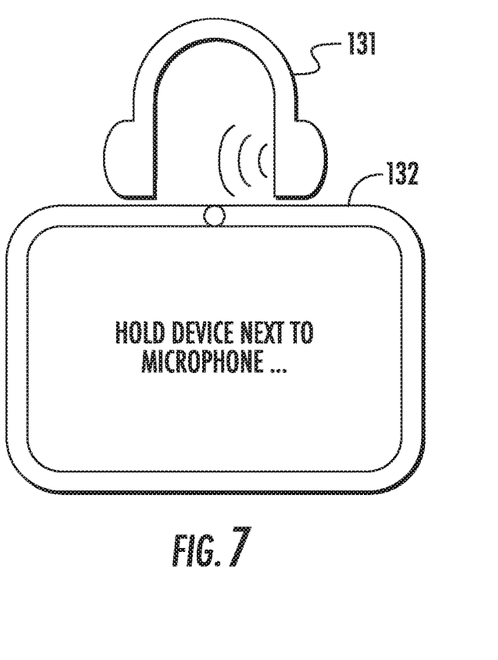
Figure 8:
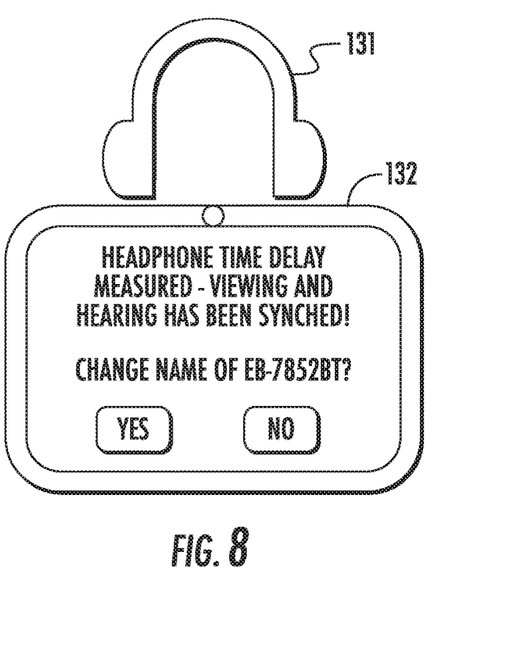

Referring additionally to FIGS. 6-8, an example approach for synchronizing audio playback across the paired wireless (e.g., Bluetooth) communication links with the corresponding video stream to provide synchronized viewing/listening is now described. As discussed above, different delays across the different Bluetooth links may result in audio and video synchronization issues, in which the video shown on the display is temporally offset from the corresponding audio stream that is being played through the headphones. The present example provides an automated synchronization process for each respective set of wireless headphones 131 that are paired with the system.

In an example process flow, for a "menu" settings screen a user may select a "Blue Tooth Pairing" option. The Bluetooth discovery process will result in an "Available Device" screen to be displayed (FIG. 6) along with all Bluetooth devices discovered within range. In the illustrated example, this is a pair of Bluetooth headphones 131 with ID number EB-7852BT, and its ID is displayed on the display 132. Moreover, this display 132 has a touch screen interface which allows a user to select the located device (i.e., the headphones 131) as indicated. Moreover, the display 132 also has a microphone 138 associated therewith.

The display 132 then transitions to a next screen that informs the user to "hold device next to the microphone", and the user may then position the wireless headphones 131 so that its speaker(s) is next to the microphone 138, as seen in FIG. 7. As the user holds the wireless headphones 131 next to the microphone 138 and waits, an audio test program will communicate with the headphones 131 through the Bluetooth link to determine the audio delay value based upon the audio picked up by the microphone. This delay value is used to synchronize the audio and video, such that the audio is in sync with the respective displayed media content.

The newly calibrated information may be stored for future use, such that next time the wireless headphones 131 are paired the requisite audio delay may automatically be utilized to sync the audio and video. It should be noted that this may be accomplished by applying delays to the audio streams of one or more sets of wireless headphones, as well as to the corresponding video stream. For example, if more than one user is watching the same display, the controller 33 may take into account the delay associated with both sets of headphones and adjust one or more different delay settings with the audio and/or video streams to provide synchronized viewing/listening.

Once the delay has been measured, a notification may be provided on the display 131 to notify the user, and optionally that the playback synchronization has been established. An optional feature may include customizing the device's name. For example, EB-7852BT could be changed to "Becky's Earbuds" or other name the user chooses. In the example illustrated in FIG. 8, the touchscreen provides "yes" and "no" buttons for the user to select to initiate device re-naming, or to skip this option.

It should also be noted that other synchronization processes may also be used with the above-described systems in some implementations. For example, a manual method of syncing Bluetooth and video may be used, in which the user manually adjusts a "sync bar" on the display 132, for example. However, such approaches may be restricted by human accuracy or error.

The above described approaches advantageously allow any set of wireless headphones to be paired with the corresponding audio streams for any of the videos being played back on any of the video displays. Moreover, the system also advantageously provides for synchronization of audio streams across different paired (e.g., Bluetooth) links (which may have different delays associated therewith) to provide synchronized viewing and hearing of the A/V content for a given display. By way of example, one system in which the above-described features may be implemented is the EVO Rear Seat Infotainment System from Voxx Automotive of Orlando, Fla. However, the techniques described herein may be incorporated in other vehicle entertainment systems as well.

Figure 9:
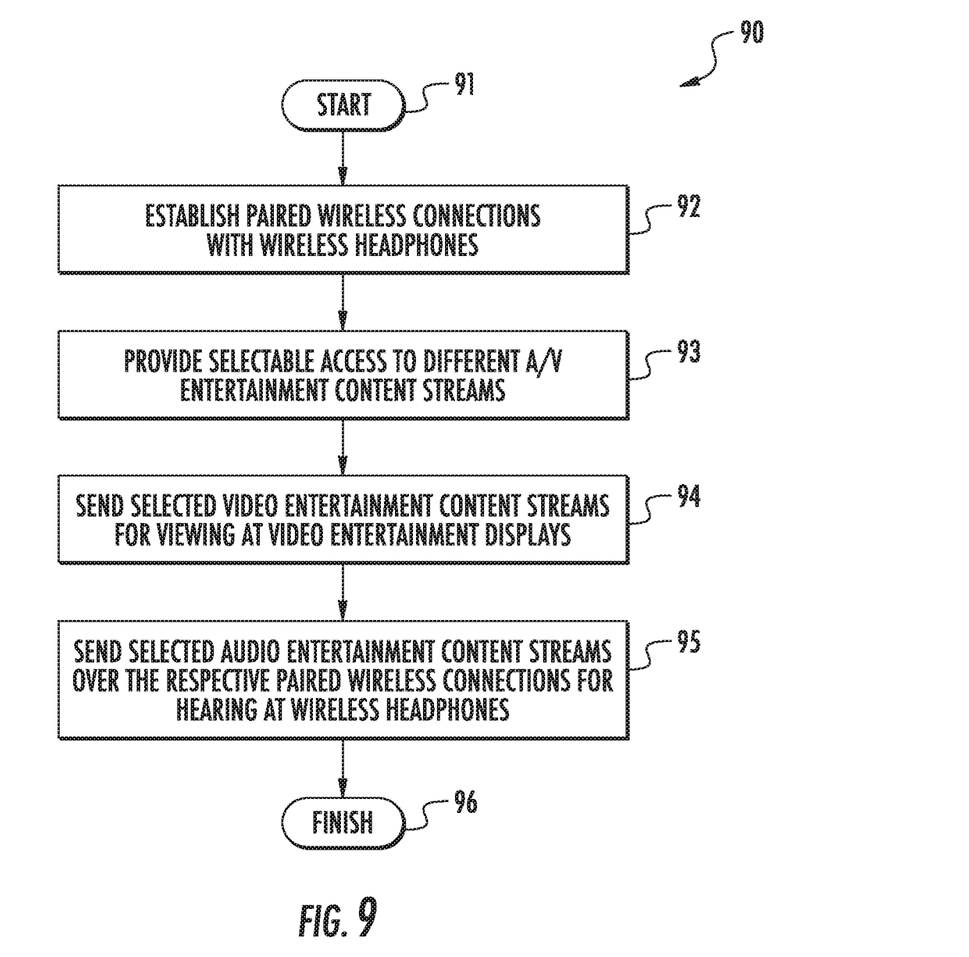
FIG. 9 is a flow chart illustrating example method aspects associated with the system of FIG. 1.

Referring additionally to the flow chart 90 of FIG. 9, a related method of providing vehicle entertainment with a plurality of wireless headphones 31 and a plurality of video entertainment displays 32 is now described. As noted above, each of the wireless headphones 31 is operable via a respective paired wireless connection. The method illustratively includes operating the controller 33 at the vehicle 34 to establish respective paired wireless connections with the wireless headphones 31 (Block 92), and provide selectable access to a plurality of different A/V entertainment content streams (A/V-1 through A/V-N), with each A/V entertainment content stream including a respective video entertainment stream and an associated audio entertainment stream, at Block 93. The controller 33 may also be operated to send selected video entertainment content streams for viewing at the video entertainment displays 32, at Block 94, and send selected audio entertainment content streams over the respective paired wireless connections for hearing at the wireless headphones 31 (Block 95), as discussed further above. The method of FIG. 9 illustratively concludes at Block 96.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle entertainment system for use with a plurality of wireless headphones, each wireless headphone being operable via a respective unicast paired wireless connection, the vehicle entertainment system comprising:
   a microphone;
   a plurality of video entertainment displays for a vehicle; and
   a controller for the vehicle and configured to
      establish respective unicast paired wireless connections with the plurality of wireless headphones, each unicast paired wireless connection having a different latency,
      provide selectable access to a plurality of different audio/video (A/V) entertainment content streams, each A/V entertainment content stream comprising a respective video entertainment stream and an associated audio entertainment stream,
      send selected video entertainment content streams for viewing at the plurality of video entertainment displays,
      display a notification on the video entertainment displays to position the wireless headphones next to the microphone,
      play an audio test signal through each wireless headphone and determine the respective latency associated with each unicast paired wireless connection based upon the audio test signal received by the wireless headphones and the microphone, send selected audio entertainment content streams over the respective unicast paired wireless connections for hearing at the plurality of wireless headphones; and introduce at least one time delay to synchronize viewing and hearing and based upon the different latencies of the unicast paired wireless connections with the plurality of wireless headphones.

2. The vehicle entertainment system of claim 1 wherein at least one of the video entertainment displays comprises a touch screen video display configured to provide a user interface for the controller.

3. The vehicle entertainment system of claim 1 wherein the controller is configured to establish a wireless connection external from the vehicle to provide the selectable access to at least one of the plurality of different A/V entertainment content streams.

4. The vehicle entertainment system of claim 1 wherein the controller comprises a respective wireless transceiver for each respective wireless connection.

5. The vehicle entertainment system of claim 4 wherein each wireless transceiver comprises a Bluetooth wireless transceiver.

6. The vehicle entertainment system of claim 1 wherein the controller comprises electronic circuitry at least some of which is collocated with at least one of the video entertainment displays.

7. The vehicle entertainment system of claim 1 wherein the controller comprises electronic circuitry at least some of which is remote from the video entertainment displays.

8. A vehicle entertainment system for use with a plurality of wireless headphones, each wireless headphone being operable via a respective unicast paired wireless connection, the vehicle entertainment system comprising:

a microphone;

a plurality of video entertainment displays for a vehicle, at least one of the video entertainment displays comprising a touch screen video display configured to provide a user interface; and a controller for the vehicle and cooperating with the user interface to establish respective unicast paired wireless connections with the plurality of wireless headphones, each unicast paired wireless connection having a different latency, provide selectable access to a plurality of different audio/video (A/V) entertainment content streams, each A/V entertainment content stream comprising a respective video entertainment stream and an associated audio entertainment stream, send selected video entertainment content streams for viewing at the plurality of video entertainment displays, display a notification on the video entertainment displays to position the wireless headphones next to the microphone, play an audio test signal through each wireless headphone and determine the respective latency associated with each unicast paired wireless connection based upon the audio test signal received by the wireless headphones and the microphone, send selected audio entertainment content streams over the respective unicast paired wireless connections for hearing at the plurality of wireless headphones, and introduce at least one time delay to synchronize viewing and hearing and based upon the different latencies of the unicast paired wireless connections with the plurality of wireless headphones.

9. The vehicle entertainment system of claim 8 wherein the controller is configured to establish a wireless connection external from the vehicle to provide the selectable access to at least one of the plurality of different A/V entertainment content streams.

10. The vehicle entertainment system of claim 8 wherein the controller comprises a respective wireless transceiver for each respective wireless connection.

11. A controller for a vehicle entertainment system for use with a plurality of wireless headphones, each wireless headphone being operable via a respective unicast paired wireless connection, the controller also for use with a plurality of video entertainment displays in a vehicle, the controller comprising:

a processor and a memory cooperating therewith and configured to establish respective paired wireless connections with the plurality of wireless headphones, each unicast paired wireless connection having a different latency, provide selectable access to a plurality of different audio/video (A/V) entertainment content streams, each A/V entertainment content stream comprising a respective video entertainment stream and an associated audio entertainment stream, send selected video entertainment content streams for viewing at the plurality of video entertainment displays, display a notification on the video entertainment displays to position the wireless headphones next to the microphone, play an audio test signal through each wireless headphone and determine the respective latency associated with each unicast paired wireless connection based upon the audio test signal received by the wireless headphones and a microphone, send selected audio entertainment content streams over the respective unicast paired wireless connections for hearing at the plurality of wireless headphones, and introduce at least one time delay to synchronize viewing and hearing and based upon the different latencies of the unicast paired wireless connections with the plurality of wireless headphones.

12. The controller of claim 11 wherein the processor is configured to establish a wireless connection external from the vehicle to provide the selectable access to at least one of the plurality of different A/V entertainment content streams.

13. The controller of claim 11 comprising a respective wireless transceiver for each respective wireless connection.

14. A method of providing vehicle entertainment with a plurality of wireless headphones and a plurality of video entertainment displays, each wireless headphone being operable via a respective unicast paired wireless connection, the method comprising:

operating a controller at the vehicle to establish respective unicast paired wireless connections with the plurality of wireless headphones, each unicast paired wireless connection having a different latency, provide selectable access to a plurality of different audio/video (A/V) entertainment content streams, each A/V entertainment content stream comprising a respective video entertainment stream and an associated audio entertainment stream, send selected video entertainment content streams for viewing at the plurality of video entertainment displays, display a notification on the video entertainment displays to position the wireless headphones next to the microphone, play an audio test signal through each wireless headphone and determine the respective latency associated with each unicast paired wireless connection based upon the audio test signal received by the wireless headphones and a microphone, send selected audio entertainment content streams over the respective unicast paired wireless connections for hearing at the plurality of wireless headphones; and introduce at least one time delay to synchronize viewing and hearing and based upon the different latencies of the unicast paired wireless connections with the plurality of wireless headphones.

15. The method of claim 14 further comprising operating the controller to establish a wireless connection external from the vehicle to provide the selectable access to at least one of the plurality of different A/V entertainment content streams.

* * * * *